United States Patent [19]

Pansini

[11] 4,063,761
[45] Dec. 20, 1977

[54] MINIMUM FRICTION SWIVEL FOR SWIMMING POOL CLEANERS

[76] Inventor: Andrew L. Pansini, 180 Los Cerros Drive, Greenbrae, Calif. 94904

[21] Appl. No.: 716,756

[22] Filed: Aug. 23, 1976

Related U.S. Application Data

[63] Continuation-in-part of Ser. No. 699,304, June 24, 1976.

[51] Int. Cl.² .............................................. F16L 27/00
[52] U.S. Cl. ........................................ 285/275; 15/1.7
[58] Field of Search ............... 285/123, 185, 191, 272, 285/275, 168; 134/167 R; 15/1.7; 403/109, 164, 165

[56] References Cited

U.S. PATENT DOCUMENTS

| 111,187 | 1/1871 | Fink | 285/185 X |
|---|---|---|---|
| 978,323 | 12/1910 | Mellin | 285/185 X |
| 1,022,126 | 4/1912 | Dennison | 285/185 X |
| 1,628,993 | 5/1927 | Olschewski | 285/185 X |
| 2,772,902 | 12/1956 | Lind | 403/165 |
| 3,665,942 | 5/1972 | Moore | 15/1.7 |

Primary Examiner—Dave W. Arola
Attorney, Agent, or Firm—Naylor, Neal & Uilkema

[57] ABSTRACT

A new type of swivel connection is used to rotatably relate a pair of concentric tubes to minimize friction forces and enable fool-proof operation of automatic swimming pool cleaners and swivel-joint hoses therefor which employ such concentric tubes.

6 Claims, 4 Drawing Figures

MINIMUM FRICTION SWIVEL FOR SWIMMING POOL CLEANERS

RELATED APPLICATION

This application is a continuation-in-part of my copending application, Ser. No. 699,304, filed June 24, 1976, for "Improved Swimming Pool Cleaners".

SUMMARY OF THE INVENTION

A number of known automatic swimming pool cleaners employ swivel joints between connected, concentric tube or hose sections. Such swivel joints are almost invariably used in the water supply hoses for such cleaners. They are also used within the cleaners themselves, as, for example, in my above-mentioned copending application wherein the improved minimum friction swivel joint of the present invention is described, and in U.S. Pat. No. 3,665,942 wherein the conventional high friction swivel joint is shown in FIGS. 3–4 and identified by reference numeral 66. These high friction swivel joints sometimes jam or tighten up to restrain freedom of movement of the water supply hoses and the transporters or heads of the automatic pool cleaners themselves. This occurs as a result of the relatively high friction nature of these conventional swivel joints as well as from the fact that dirt or foreign particles from the pool water or the supply water tends to get into these joints and lodge between the high area interfacial surfaces therein to interfere with the mobility of the joint elements.

One object of the invention is to provide a minimum friction swivel joint for such supply hoses and cleaners.

Another object of the invention is to provide a swivel joint of the type described which will not bind up under the action of dirt particles.

Other objects and advantages of the invention will be apparent from the following description taken in conjunction with the drawing forming part of this specification, and in which.

Figure 1:
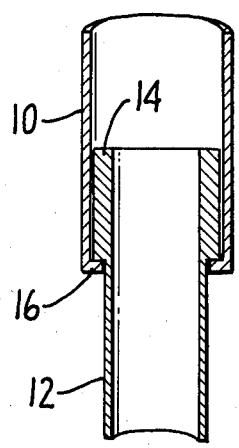
FIG. 1 is a view in vertical diametral section of a conventional swivel joint for supply hoses and pool cleaners.

The conventional swivel joint of FIG. 1 comprises a pair of concentrically related tube or hose sections 10 and 12 having complemental connection means comprising a ring member 14 affixed to the upper end of the lower tube 12 and an annular flange 16 formed on the lower end of the upper tube 10. This is the form of conventional swivel joint which is identified by reference numeral 66 in FIGS. 3 and 4 of the U.S. Pat. No. 3,665,942, to Moore which was referred to above. It is usually intended that the tube 12 rotate about its vertical axis and that the tube 10 remain stationary, i.e. be non-rotatable. Fairly generous clearances are provided between the interfacial surfaces of 10, 14 and 16, but these surfaces tend to be pressed together under the pressure condition of the water flowing through the tubes 10 and 12. This sets up a fairly high friction condition which tends to restrict the rotatability of tube 12 relative to the tube 10. Typically, the tube 12 supplies an off-center drive jet which tends to move the cleaner through the water and to also turn the tube 12 about its vertical or longitudinal axis. Due to the high friction nature of this swivel joint, as well as to its vulnerability to freezing-up when dirt particles become lodged between the interfaces, it will be appreciated that the cleaner can fairly readily be rendered inoperable.

In the FIG. 1 embodiment of the present invention, the upper, or outer, tube 110 is connected to the lower, or inner, tube 112 by swivel connection means comprising rod member 118 fixedly attached to tube 110 diametrically thereof, rod member 120 fixedly attached to tube 112 diametrically thereof, and rod member 122 which extends along the longitudinal axes of the two tubes and loosely through bores formed in members 118 and 120. Member 122 is provided with headed ends 124 and 126 serving to retain the rod 122 in captured but freely rotatable relation to rod members 118 and 120. There is a suitable annular clearance space between the interjacent surface portions of the tubes 110 and 112. The resistance to the free turnability of one tube relative to the other is defined by the minimal frictional contact between the headed rod member 122 and the rod members 118 and 120. This is to be contrasted with the high friction, high areal contactability of elements 10, 14 and 16 of FIG. 1.

Figure 3:
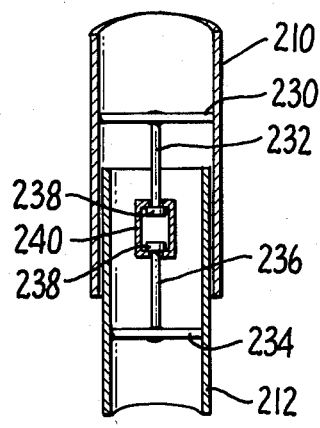
FIG. 3 is a view in perspective of another embodiment of the swivel joint of the invention.

In the modification of FIG. 3 the tube 210 is swivelly connected to tube 212 by means comprising rod member 230 fixedly attached to tube 210 diametrically thereof, rod member 232 fixedly attached to member 230 and depending from the midpoint thereof, rod member 234 fixedly attached to tube 212 diametrically thereof, rod member 236 fixedly attached to rod member 234 and perpendicular to the midpoint of the latter, bearing knobs 238 formed on the ends of rod members 232 and 236, and a cylindrical cage 240 which is freely, rotatably related to the rod members 232, 236 and encloses the knob members 238. The frictionally engageable surfaces of tubes 210 and 212 are therefore composed of the inter-engageable surface portions of the knobs 238 and the cage member 240.

Figure 4:
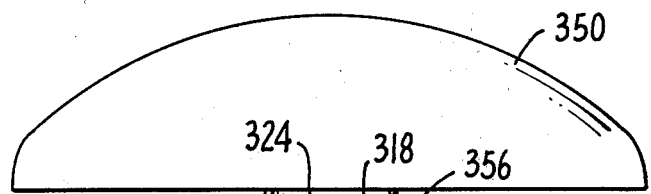
FIG. 4 is a view in perspective of a further embodiment of the swivel joint of the invention, within the overall environment of an automatic swimming pool cleaner.

The FIG. 4 embodiment of the swivel joint of the invention comprises tubes 310 and 312, the latter having a closed lower end 314. The tubes are interconnected by swivel means comprising rod member 318 fixedly attached to tube 310 and extending diametrically thereof, axially disposed rod member 322 which is provided with heads 324 and 326 and which extends freely and rotatably through the central apertures or bores formed in the rod member 318 and the end wall 314 of tube 312.

The tube 310 is carried by a float member 350. Pressurized water from a water supply source passes downwardly through tubes 310 and 312 and issues from an off-center drive jet 352 carried by tube 312 and constituting the drive means for the automatic pool cleaner shown. The tube 312 has attached thereto a rudder blade 354. Attached within the tube 310 is a water flow diverter wedge 356 which serves to divert the water into the tube 312 and away from the annular space between the tubes 310 and 312.

The FIG. 4 embodiment shows a form of the swivel joint of the invention installed in a pool cleaner of the type shown in Moore 3,665,942. The swivel joint of the invention replaces the conventional swivel 66 shown in FIGS. 3–4 of said patent.

Figure 2:
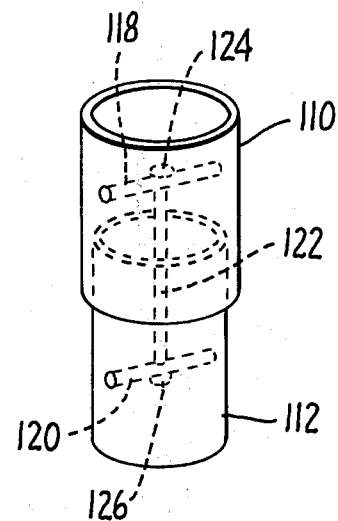
FIG. 2 is a view in perspective of an embodiment of the minimum friction swivel joint of the invention.

Various other forms of the swivel joint of the invention will readily occur to those skilled in the art. For example, the upper tube 110 of FIG. 2 may be in the form of an elbow rather than a straight length of tube, in which event the vertical hanger rod 122 can extend upwardly and through the wall of the elbow, the elbow wall serving in lieu of the rod member 118 of FIG. 2.

What is claimed is:

1. In an automatic pool cleaner having a carrier, water conduit means connected thereto having first and second loosely interfitting concentric conduit sections, and swivel means interconnecting said first and second sections whereby said sections are freely rotatable at all times relative to each other: an improved swivel means comprising a first rod member extending diametrically of said first section and fixedly attached thereto, a second rod member extending diametrically of said second section and fixedly attached thereto, a third rod member extending axially of said sections and loosely through said first and second rod members, centrally thereof, and means connecting said third rod member to said first and second rod member to swivelly support said second conduit section with respect to said first conduit section, said last-mentioned means comprising enlarged end members carried by said third rod member permanently disposed in free rotational, non-clamping, surface-bearing engagement with said first and second rod members.

2. In an automatic pool cleaner having a carrier, water conduit means connected thereto having first and second loosely interfitting concentric conduit sections, and swivel means interconnecting said first and second sections whereby said sections are freely rotatable at all times relative to each other: an improved swivel means comprising a first rod member extending diametrically of said second section and fixedly attached thereto, a second rod member extending axially of said sections, said second rod member being attached to said first section and carried thereby, said second rod member extending loosely through the center of said first rod member, and means connecting said second rod member to said first rod member to swivelly support said second conduit section with respect to said first conduit section, said last-mentioned means comprising an enlarged end member carried by said second rod member permanently disposed in free rotational, non-clamping, surface-bearing engagement with said first rod member.

3. In an automatic pool cleaner having a carrier, water conduit means connected thereto having first and second loosely interfitting concentric conduit sections, and swivel means interconnecting said first and second sections whereby said sections are freely rotatable at all times relative to each other: an improved swivel means comprising a first member extending diametrically of said first section and fixedly attached thereto, a second member extending diametrically of said second section and fixedly attached thereto, a rod member extending axially of said sections and loosely through said first and second members centrally thereof, and means connecting said rod member to said first and second members to swivelly support said second conduit section with respect to said first conduit section, said last-mentioned means comprising enlarged end members carried by said rod member permanently disposed in free rotational, non-clamping, surface-bearing engagement with said first and second members.

4. In an automatic pool cleaner having a carrier, water conduit means connected thereto having first and second loosely interfitting concentric conduit sections, and swivel means interconnecting said first and second sections whereby said sections are freely rotatable at all times relative to each other: an improved swivel means comprising a first member extending diametrically of said second section and fixedly attached thereto, a rod member extending axially of said sections, said rod member being attached to said first section and carried thereby, said rod member extending loosely through the center of said first member, and means connecting said rod member to said first member to swivelly support said second conduit section with respect to said first conduit section, said last-mentioned means comprising an enlarged end member carried by said rod member permanently disposed in free rotational, non-clamping, surface-bearing engagement with said first rod member.

5. In an automatic pool cleaner having a carrier, water conduit means connected thereto having first and second loosely interfitting concentric conduit sections, and swivel means interconnecting said first and second sections whereby said section are freely rotatable at all times relative to each other: an improved swivel means comprising a first member extending diametrically of said first section and carried thereby, a second member extending diametrically of said second section and carried thereby, a first rod member attached to and carried by said first member normal thereto and centrally thereof extending toward said second member, a second rod member attached to and carried by said second member normal thereto and centrally thereof extending toward said first member, enlarged bearing members on the adjacent ends of said first and second rod members, a cage means enclosing said bearing members and permanently interconnecting the same for free rotative movement relative to each other.

6. In an automatic pool cleaner having a carrier, water conduit means connected thereto having first and second loosely interfitting concentric conduit sections, and swivel means interconnecting said first and second sections whereby said sections are freely rotatable at all times relative to each other: an improved swivel means comprising a first member extending diametrically of said first section and fixedly carried thereby, a second member extending diametrically of said second section and fixedly carried thereby, a first rod member attached to and carried by said first member normal thereto and centrally thereof extending toward said second member, a second rod member attached to and carried by said second member normal thereto and centrally thereof extending toward said first member, enlarged bearing members on the adjacent ends of said first and second rod members, and cage means enclosing said bearing members and permanently interconnecting the same for free rotative movement relative to each other.

* * * * *